United States Patent [19]

Biviano

[11] Patent Number: 4,568,107
[45] Date of Patent: Feb. 4, 1986

[54] SAFETY BELT OVERHEAD HOLDER

[76] Inventor: J. Marion Biviano, 6484 Furnace Rd., Ontario, N.Y. 14519

[21] Appl. No.: 677,984

[22] Filed: Dec. 4, 1984

[51] Int. Cl.$^4$ .................................................. B60R 21/10
[52] U.S. Cl. ..................................... 280/808; 280/801; 297/468
[58] Field of Search ............... 280/801, 808; 297/387, 297/388, 389, 390

[56] References Cited

U.S. PATENT DOCUMENTS

| | | | |
|---|---|---|---|
| 3,810,657 | 5/1974 | Campbell | 280/808 |
| 3,829,123 | 8/1974 | Holka | 280/808 |
| 3,841,657 | 10/1974 | Ewert et al. | 280/808 |
| 3,907,329 | 9/1975 | Erion et al. | 280/808 |
| 4,060,260 | 11/1977 | Collins | 280/808 |
| 4,072,323 | 2/1978 | Shimokawa et al. | 280/808 |
| 4,253,681 | 3/1981 | Barnett | 280/808 |
| 4,323,278 | 4/1982 | Sukopp et al. | 280/808 |
| 4,400,013 | 8/1983 | Imai | 280/808 |
| 4,465,302 | 8/1984 | Miki et al. | 280/808 |
| 4,518,174 | 5/1985 | Sedlmayr | 280/808 |

Primary Examiner—Richard A. Bertsch
Attorney, Agent, or Firm—Samuel R. Genca

[57] ABSTRACT

A safety belt overhead holder for a shoulder safety belt in a two-door vehicle body having a front seat with a forward foldable seat back coupled to the shoulder safety belt and also having a rear seat is disclosed. The safety belt overhead holder features a lateral pivotal lever for supporting the shoulder safety belt when the shoulder safety belt is manually placed thereon and the shoulder safety belt is automatically released by the lateral pivotal lever in response to rearward movement of the shoulder safety belt and the forwardly tipped foldable seat back of the front seat returning to an upright sitting position. The safety belt overhead holder also features a biasing means for yieldingly biasing the lateral pivotal lever to a belt holding position wherein said shoulder safety belt may be manually supported again on said lateral pivotal lever.

6 Claims, 14 Drawing Figures

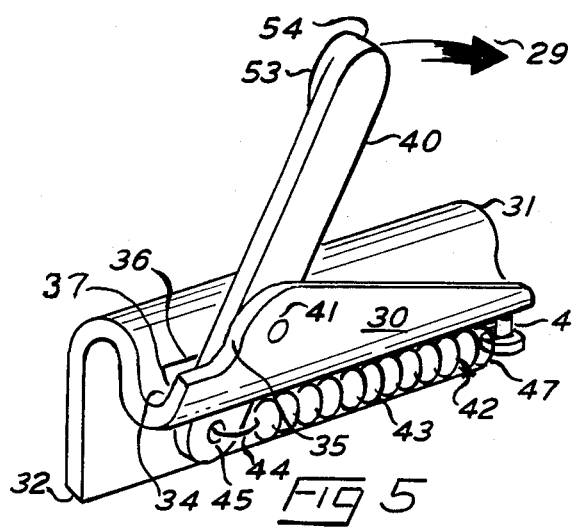
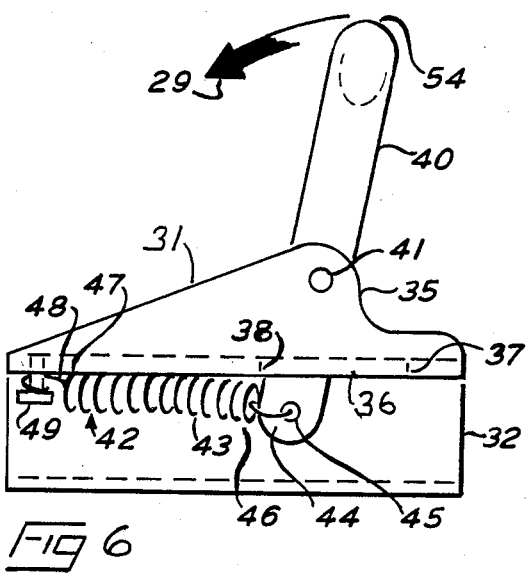
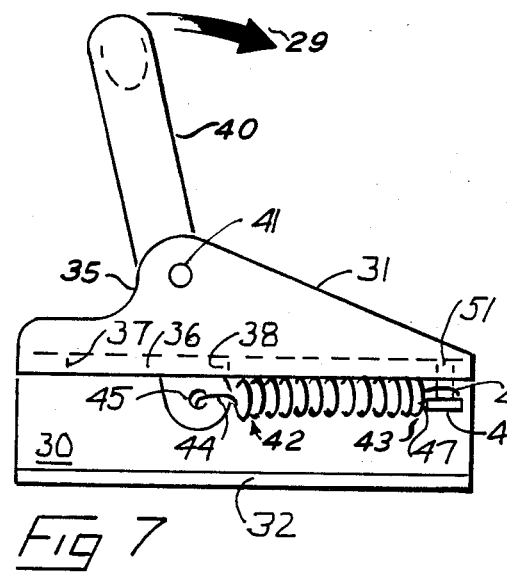
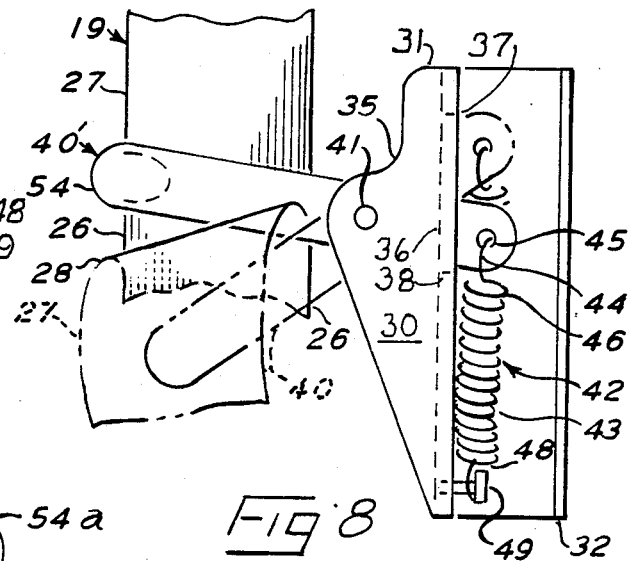
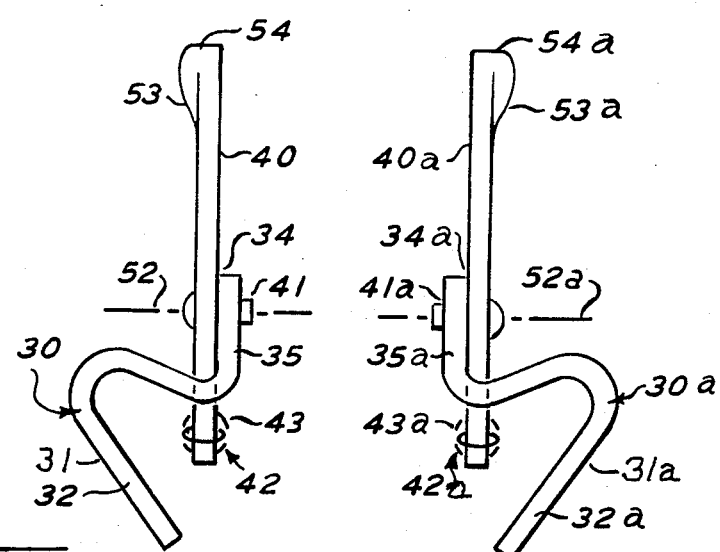

SAFETY BELT OVERHEAD HOLDER

BACKGROUND OF THE INVENTION

1. Field of the Invention

The present invention relates to automotive safety seat belts and more particularly to a safety belt overhead holder for an automotive safety seat belt including a shoulder safety belt in a two-door vehicle body having a rear seat and also having a front seat with a forward foldable seat back coupled to the shoulder safety belt which shoulder safety belt is easily and conveniently placed in an unobstructing position during entering or exiting from the rear seat through one of the two doors of the vehicle body.

2. Prior Art

The State of New York has enacted an amendment to the Vehicle and Traffic Law in relation to requiring operators and passengers in motor vehicles to wear safety seat belts starting on Jan. 1, 1985. The Federal government previously required that all passenger vehicles sold in this country be equipped with safety belts including lap belts and shoulder belts. While seat belts indeed do protect drivers and passengers, the seat belts, particularly the type used in a two-door vehicle, do present some inconveniences and obstacles to an occupant entering or exiting a door port from the rear seat of a two-door vehicle.

Accordingly, it is an object of the present invention to provide a seat belt overhead holder which will add convenience to the use of the shoulder belt so that it may be accepted more widely by the public. In the past, attempts have been made to automatically raise a shoulder seat safety belt coupled to the front seat back of a front seat as the seat is moved in a forwardly tipped position. Such prior art devices include the shoulder belt position device as described in U.S. Pat. No. 3,810,657 entitled "SHOULDER BELT POSITIONING ARRANGEMENT" issued to David D. Campbell. Other such devices are described in U.S. Pat. No. 4,060,260 entitled "SEAT BELT CONTROL DEVICE" issued to Cecil A. Collins.

None of the aforesaid prior art patents and no other means are known to the applicant to utilize a safety belt overhead holder for providing a convenient, inexpensive device for placing the shoulder belt in an unobstructing position so that the occupant may enter or exit the vehicle body through a door port thereof to the rear seat without interference of the shoulder belt when it traverses one of the door ports on the two-door vehicle body.

SUMMARY OF THE INVENTION

Briefly described, the safety belt overhead holder in accordance with a preferred embodiment of the invention coacts with a roof mounted belt retractor and the forward foldable seat back of a front seat both of which are coupled to a shoulder safety belt at points 1, 2 respectively. The belt retractor maintains the shoulder safety belt taut in a straight line between points 1 and 2 and yet pays out the shoulder belt when the foldable front seat back is tipped forward for easy access by an occupant through the door port of a two-door vehicle body.

The safety belt overhead holder comprises a frame, mounting means for fixing the frame in the vehicle body over the door port of the vehicle body and a laterally extending lever pivotally mounted on the frame at a third point for pivotal movement about an axis of rotation from a belt holding position rearwardly to a belt non-holding position. The shoulder belt may be manually uplifted and placed on the laterally extended lever at the third point to provide an unobstructed path to and from the rear seat through the door port of the vehicle body. The lever arm is moveable rearwardly to the belt non-holding position in response to rearward movement of the shoulder belt caused by the return of the forwardly tipped seat back to an upright position for automatically releasing the shoulder safety belt from the pivotal lever at the third point. The safety belt overhead holder also includes biasing means fixed to said frame for yieldingly biasing the lever to the belt holding position when the shoulder belt is released from the lever.

BRIEF DESCRIPTION OF THE DRAWINGS

A preferred embodiment of the invention is illustrated in the accompanying drawings, in which:

FIG. 5 is a perspective view of a safety belt overhead holder in accordance with a preferred embodiment of the invention for use on the passenger or right side of a two-door vehicle;

FIG. 6 is a rear view of the safety belt overhead holder in accordance with a preferred embodiment of the invention;

FIG. 7 is a front view of the safety belt overhead holder;

FIG. 8 is a fragmentary top view of the safety belt overhead holder in the normal belt holding position;

FIG. 9 is an end view of the safety belt overhead holder shown in FIGS. 5 through 8;

FIG. 10 is a perspective view of another safety belt overhead holder which is similar to the safety belt overhead holder of FIG. 1 but is usable on the left side or driver's side of a two-door vehicle;

DESCRIPTION OF THE PREFERRED EMBODIMENT

Figure 1:
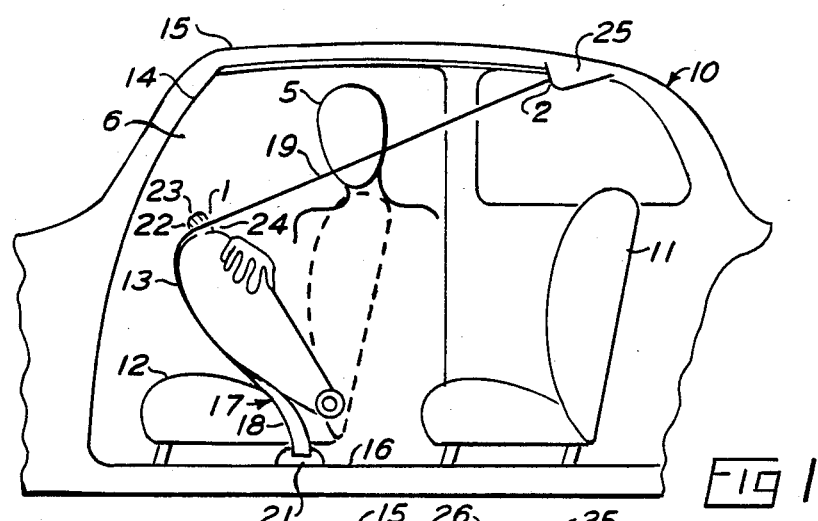
FIG. 1 is a fragmentary cross-sectional view of a two-door motor vehicle body having a rear seat and a front seat with a forward foldable back forwardly tipped in an easy entry position and a shoulder safety belt connected to the front seat back and a belt retractor obstructing a path through a door port of the vehicle body.

The safety belt overhead holder 30 of the present invention will be described with particular reference to the preferred embodiment illustrated in FIGS. 2, 3, 4, 5, 6, 7, 8, 9, 11 and 12 in the drawing. It should be understood that the drawing illustrations and descriptions are to be taken only as illustrative of the preferred embodiment of the safety belt overhead holder 30 of the present invention and it is to be understood in a general way and not in a restrictive way.

FIG. 1 illustrates the aforesaid problem of the shoulder belt 19 interfering with an occupant entering or exiting a two-door vehicle body 10. FIG. 1 shows a two-door vehicle body 10 having a rear seat 11, a front seat 12, a forward foldable seat back 13 of the front seat 12, a door port 14, a roof 15 and a floor 16. The two-door vehicle body 10 also includes a safety seat belt 17 having a lap belt 18 and a shoulder safety belt 19. The lap belt 18 is connected to a floor anchor 21 and to the shoulder safety belt 19. The shoulder safety belt 19 extends across the seat back 13 through an opening 22 of a belt guide member 23 fixed to a top portion 24 of the forward foldable seat back 13. The shoulder safety belt 19 is coupled to the forward foldable seat back 13 by the belt guide member 23 and a roof mounted belt retractor 25. The roof mounted belt retractor 25 maintains the shoulder belt 19 in a taut condition between a first point 1 on the seat back 13 and a second point 2 on the belt retractor 25 so that the shoulder safety belt 19 defines a straight line between the first point 1 and the second point 2. An occupant 5 is shown in an occupant compartment 6 in the two-door vehicle body 10. The aforesaid problem present in a two-door vehicle body 10 and the shoulder belt 19 is that the shoulder belt 19 lies traverse to the door port 14 of the vehicle body 10 and extends as an obstacle to the occupant 5 entering or exiting from the rear seat 11 through the door port 14 of the vehicle body 10.

Figure 2:
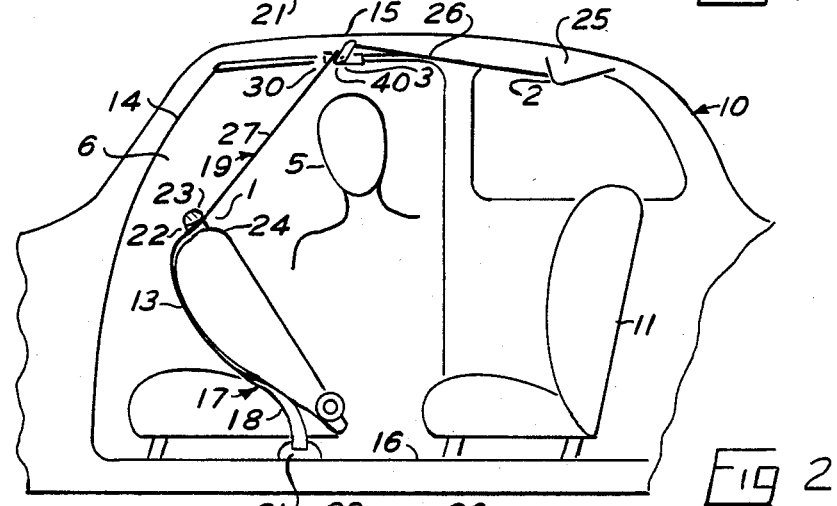
FIG. 2 is a fragmentary cross-sectional view similar to FIG. 1 showing a safety belt overhead holder in accordance with the invention to solve the problem of the obstructed path illustrated in FIG. 1.

Referring now to FIG. 2, the two-door vehicle body 10 is the same as shown in FIG. 1 and is shown with the safety belt overhead holder 30 in accordance with the invention disposed at a point 3 inside the occupant compartment 6 and over the door port 14 of the vehicle body 10. The shoulder safety belt 19 when manually placed on the safety belt overhead holder 30 is supported at three points namely 1, 2 and 3 to provide non-interference to the occupant 5 for entering or exiting through the door port 14 of the vehicle body 10 in accordance with the present invention.

Figure 3:
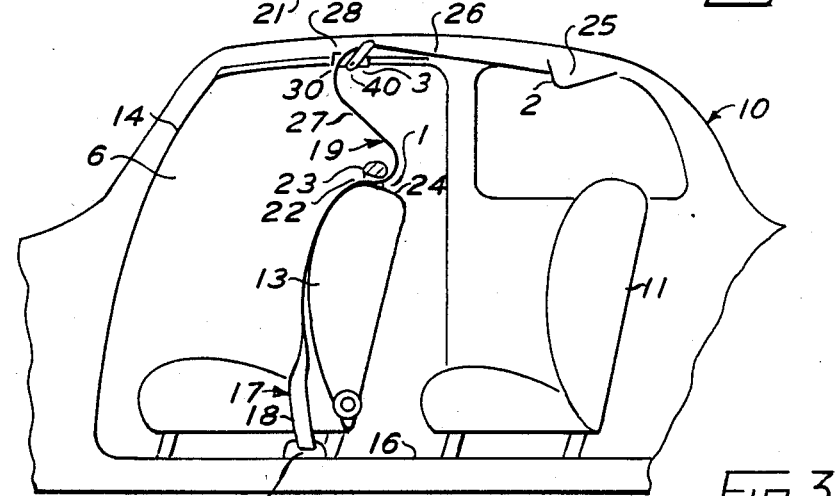
FIG. 3 is a view similar to FIG. 2 illustrating the safety belt overhead holder in operation when the front seat back is being returned to an upright seating position.
Figure 4:
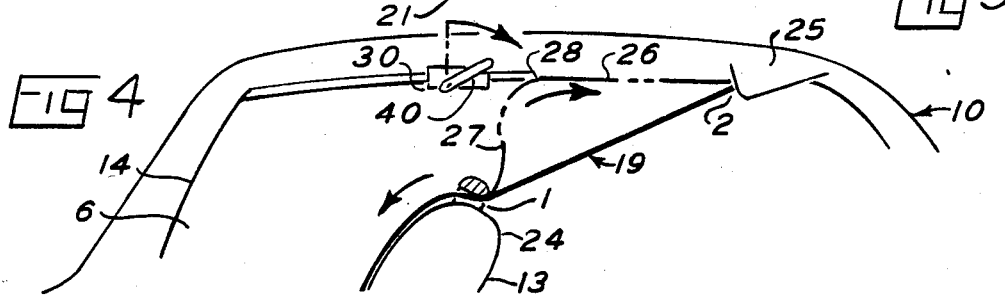
FIG. 4 is a fragmentary cross-sectional view showing the safety belt overhead holder automatically releasing the safety belt when the front seat back is returned to the upright seating position.

Referring now to FIGS. 3 and 4, the operation and coaction of the safety belt overhead holder 30 with the shoulder safety belt 19, belt retractor 25 and forward foldable seat back 13 is shown. Reference to FIGS. 3 and 4 will be made in greater detail in explaining the operation of the safety belt overhead holder 30 hereinafter.

Referring more particularly to FIGS. 5, 6, 7, 8 and 9, the safety belt overhead holder 30 includes a monolithic frame 31 preferably made of plastic material; however, the frame 31 may be made of steel or aluminum without departing from the invention. The frame 31 includes a roof mounting portion 32 which is insertable between door port molding 33 and roof 15 (see FIGS. 11 and 12).

The roof mounting portion 32 is generally flat and thin for insertion between the roof 15 and door port molding 33. The frame 31 also includes a frame bearing surface 34 and a caming surface 35. Frame 31 includes a slot 36 having stop portion 37 at one end of slot 36 and a stop portion 38 at the other end of slot 36 of frame 31. The safety belt overhead holder 30 also includes a lever 40 pivotally mounted on the frame 31 with a pivot pin 41 fixed to the frame 31. The lever 40 extends through the slot 36 and is mounted for rotation at pin 41 between the stop portions 37 and 38 of the frame 31 and about an axis of rotation 52. The lever 40 includes a button portion 53 at lever end 54 for retaining the shoulder safety belt 19 thereon. A safety belt overhead holder 30 includes a biasing means 42 for yieldingly biasing the lever 40 against the stop portion 38 of the frame 31. The biasing means 42 includes a tension spring 43 having a loop 44 at one end 46 connected at a hole 45 in the lever 40 and is coupled at the other end 47 by a loop 48 of the tension spring 43 on a pin 49 fixed in the hole 51 of the frame 31. The pin 49 is fixed to the frame 31 in a hole 41 by a press fit or the pin 49 may be riveted to the frame 31. It should be understood that while a tension spring 43 is illustrated in use with the biasing means 42, other resilient means such as a circular wound clock spring may be used for biasing the lever 40 against the stop portion 38 of the frame 31 without departing from the invention.

Referring again to FIG. 8, a bottom view of the safety belt overhead holder 30 is shown with the lever 40 supporting the shoulder safety belt 19 in a belt supporting position and also shows in phantom view the lever 40 being pivoted or rotated about the pivot pin 41 and axis of rotation 52 to the belt non-supporting position in response to the shoulder safety belt 19 moving rearwardly by portions 26, 27 of the shoulder safety belt 19 (see FIG. 3). Please note that FIG. 8 is the view that one would have if one were sitting in the rear seat 11 and were watching the coaction of the safety belt overhead holder 30 with the shoulder safety belt 19 and portions 26, 27 coacting on the lever 40.

OPERATION

Figure 11:
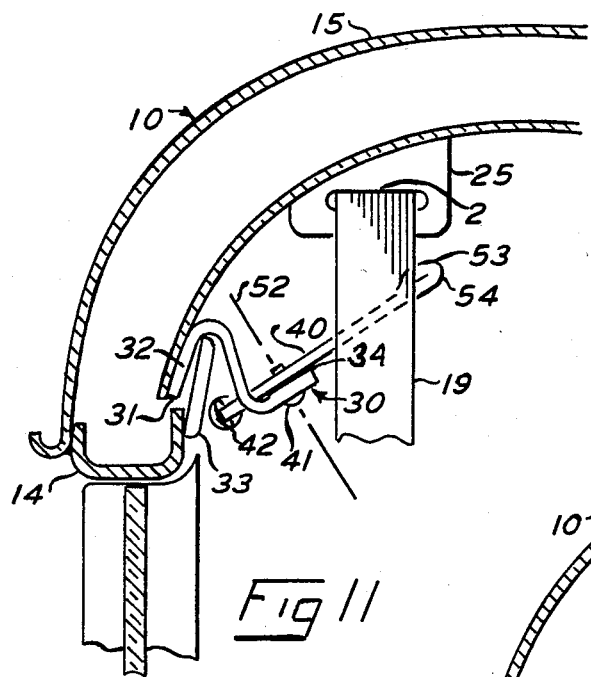
FIG. 11 is a fragmentary cross-sectional view of a safety belt overhead holder being coupled to a car molding of a two-door vehicle and holding a shoulder safety belt thereon.
Figure 12:
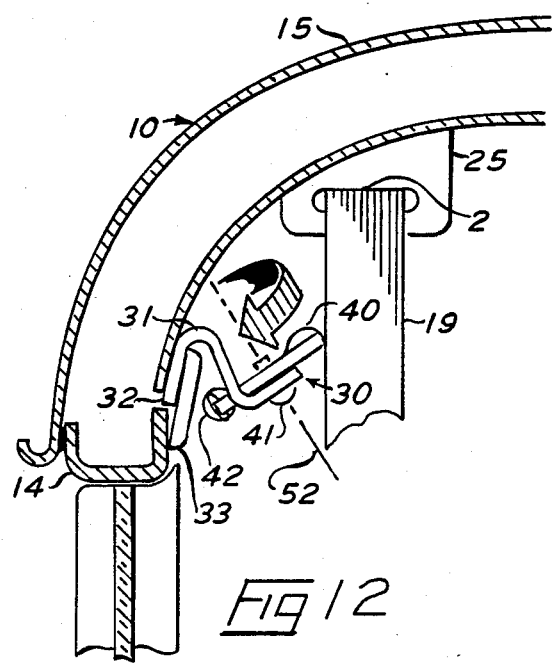
FIG. 12 is a fragmentary cross-sectional view similar to FIG. 11 showing the shoulder safety belt being released from the safety belt overhead holder.

The operation of the safety belt overhead holder 30 will now be explained in conjunction with FIGS. 1–12 of the drawing. The safety belt overhead holder 30 is insertable at point 3 between the roof 15 and the door port molding 33 by the roof mounting portion 32 of the frame 31. Preferably, point 3 is disposed just forward of the top portion 24 of the seat back 13 when the seat back 13 is disposed in the upright sitting position but not beyond the forward position of the top portion 24 of the seat back 13 when the seat back 13 is disposed in the forwardly tipped portion. Ideally, the lever 40 is disposed at point 3. When the safety belt overhead holder 30 is thus disposed at point 3, the shoulder safety belt 19 may be placed manually on the safety belt overhead holder 30 as shown in FIG. 2. The shoulder safety belt 19 thus supported at three points, namely 1, 2 and 3, allow occupant 5 unobstructed access entry and exit from the back seat 11 as shown in FIG. 2. The lever 40 supports the shoulder safety belt 19 between shoulder portions 26, 27 of the shoulder safety belt 19. The lever 40 is pivoted about pin 41 and the axis of rotation 52. It should be noted that the axis of rotation 52 as is clearly shown in FIGS. 11 and 12, is perpendicular to the lever 40 and tilted so that the lever 40 is pointed towards the roof 15 and away from occupant 5 in the vehicle body 10. When the seat back 13 is tipped forward, the retractor 25 pays out the shoulder safety belt 19 while keeping the shoulder safety belt 19 taut. This same function and structure of the retractor 25 applies to the manual uplifting of the shoulder safety belt 19 onto the safety belt overhead holder 30. When the seat back 13 is being returned to the upright sitting position, the portion 27 of the shoulder safety belt 19 lags behind the top portion 24 of the seat back 13, viz. point 1 and the guide member 23. This lagging of the shoulder belt portion 27 of the shoulder safety belt 19 forms a loop 28 with the shoulder belt portion 26 of the shoulder safety belt 19 which coacts with the lever 40 to rotate and pivot the lever 40 from the belt supporting position to the belt non-supporting poistion as shown in FIGS. 3, 4 and 8. Once the shoulder safety belt 19 has been released from the safety belt overhead holder 30, the belt retractor 25 again makes the shoulder safety belt 19 taut by taking in or reeling in the shoulder safety belt 19.

Referring now to FIGS. 5, 6, 7, a dark shaded arrow 29 illustrates the rearward pivotal action of the lever 40 pivoting about pin 41. When the lever 40 is pivoted about the pin 41, the biasing means 42 and tension spring 43 urge the lever 40 back to the belt supporting position and against stop portion 38 of the frame 31 at the end of slot 36. The caming surface 35 of the frame 31 assists the shoulder safety belt 19 to travel along the lever 40 as the lever 40 is moving to the belt non-supporting position.

OTHER EMBODIMENTS

The safety belt overhead holder 30 shown in FIGS. 2 through 9 is for the passenger or right side in the vehicle body 10, and may be considered a right hand safety belt overhead holder 30. FIG. 10 shows a safety belt overhead holder 30a which is the mere image of the safety belt overhead holder 30 and is for use in the left side of the vehicle body 10 and is considered a left hand safety belt overhead holder 30a. All of the corresponding elements of the safety belt overhead holder 30a are the same as those of the right hand safety belt overhead holder 30; however, to show the corresponding parts, a small letter "a" has been added to each corresponding part for the left hand safety belt overhead holder 30a. The function and operation of the safety belt overhead holder 30a are the same as those of the safety belt overhead holder 30.

The left hand safety belt overhead holder 30a includes a frame 31a and a lever 40a pivotally mounted on the frame 31a about the axis of rotation 52a on a pin 41a fixed to the frame 31a. The lever 40a may for extra support glide along bearing surface 34a of the frame 31a. The lever 40a also includes button portion 53a at the end 54a of the lever 40a. The frame 31a also includes a roof mounting portion 32a disposed angularly with the axis of rotation 52a so that the lever 40a is directed towards the roof 15 of the two-door vehicle 10 when inserted between the door port molding 33 and roof 15 of the vehicle body 10. The left hand safety belt overhead holder 30a also includes a biasing means 42a for biasing the lever 40a to a belt supporting position when the lever 40a is pivoted about the axis 52a. The frame 31a also includes a camming surface 35a for camming the shoulder belt 10 to the lever 40a. The lever 40a is restricted for movement between the belt supporting position and rearwardly to the belt non-supporting position when placed on the left side of the vehicle body 10.

Figure 13:
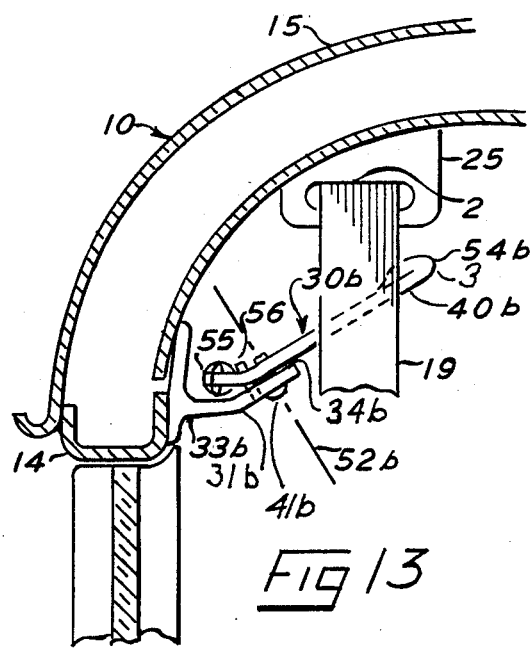
FIG. 13 is a fragmentary cross-sectional view of another embodiment of the safety belt overhead holder of the two-door vehicle body.
Figure 14:
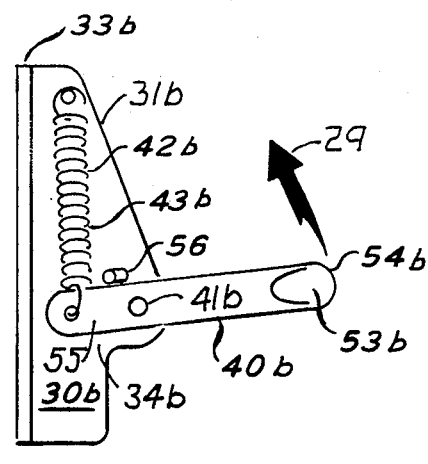
FIG. 14 is a top view of the safety belt overhead holder in accordance with another embodiment of the invention shown in FIG. 13.

Another embodiment of the invention is shown in FIGS. 13 and 14 in a right hand safety belt overhead holder 30b. Elements of the safety belt overhead holder 30b similar to the safety belt overhead holder 30 are given the same numeral designation with small letter "b" added thereto. The safety belt overhead holder 30b is made an integral part of the door port molding 33b and includes a frame 31b and a lever 40b pivotally mounted on the frame 31b on pin 41b. The lever 40b has a bent portion 55 to allow room for the tension spring 43b of the biasing means 42b. The biasing means 42b biases the lever 40b to the belt supporting position and against stop pin 56 fixed to the frame 31b. The lever 40b includes button portion 53b at the lever end 54b to keep the shoulder safety belt 19 from slipping off the lever 40b.

The frame 31b of the safety belt overhead holder 30b is disposed at point 3. It will be remembered that point 3 is located on top of the door port molding 33b of the vehicle body 10, which point 31 is forward of the guide member 23 fixed on the top portion 24 of the seat back 13 when the seat back 13 is in the upright sitting position and is to the rear of the guide member 23 when the seat back 13 is folded forward for easy access to the rear seat 11. Thus, when the shoulder belt 19 is manually placed on the lever 40b at point 3, the shoulder belt 19 forms a loop 28 with portions 26 and 27 of the shoulder belt 19, which loop 28 coacts with the lever 40b to move the lever 40b rearwardly from the belt supporting position to the belt non-supporting position as the seat back 13 travels and returns to the upright seating position.

As the loop 28 of the shoulder belt 19 coacts with the lever 40b, the biasing means 42b and the spring 43b yield to the rearward movement of the loop 28 of the shoulder belt 19 permitting the shoulder belt 19 to be cammed and slipped off the lever 40b as the lever 40b is rotated rearwardly in the vehicle body 10. The large dark arrow 29 shows the rearward rotation of the lever 40b about the pin 41b. Once the shoulder belt 19 has slipped off the lever 40b, the biasing means 42b returns the lever 40b to the belt supporting position and against the stop pin 56.

Having thus described the invention, it will be evident that other modifications and improvements may be made by one skilled in the art which would come within the scope of the annexed claims.

What is claimed as new and desired to be secured by Letters Patent of the United States is:

1. In a two-door type vehicle body including a roof covering an occupant compartment thereof, a rear seat, a front seat with a forward foldable seat back movable between an upright seating position and a forwardly tipped easy entry position, an occupant access door port for an occupant entering or exiting said door port to said front seat and said rear seat, a shoulder safety belt for an occupant of said front seat, guide means mounted on an upper portion of said seat back for coupling said shoulder safety belt to said seat back, a belt retractor means fixed to said roof inside of said compartment and connected to said shoulder belt for paying out said shoulder belt as needed for said movement of said seat back and said front seat occupant and for maintaining said shoulder belt taut, said shoulder belt being disposed proximal to said door port and transferse thereto the combination comprising:

(a) a frame,
(b) mounting means for fixing said frame in said compartment of said vehicle body over said door port,
(c) a belt supporting means including a laterally extending lever pivotally mounted on said frame for pivotal movement about an axis of rotation from a belt holding position rearwardly to a belt non-holding position for selectively holding said shoulder belt over said door port of said vehicle body when said shoulder belt is manually uplifted thereon, (i) said lever being movable rearwardly to said belt non-holding position in response to rearward movement of said shoulder belt, and (d) biasing means fixed to said frame for yieldingly biasing said lever to said belt holding position.

2. In a two-door type vehicle body including a roof covering an occupant compartment thereof, a rear seat, a front seat with a forward foldable seat back movable between an upright seating position and a forwardly tipped easy entry position, an occupant access door port for an occupant entering or exiting said door port to said front seat and said rear seat, a shoulder safety belt for an occupant of said front seat, a belt retractor means fixed to said roof inside of said compartment and connected to said shoulder belt for paying out said shoulder belt as needed for said movement of said seat back and said front seat occupant and for maintaining said shoulder belt taut, said shoulder belt defining a straight line between a first point on said front seat back and a second point at said retractor means, said shoulder belt being disposed proximal to said door port and transverse thereto the combination comprising:

(a) a frame, (b) mounting means for fixing said frame in said compartment of said vehicle body over said door port, (c) a belt supporting means including a laterally extending lever pivotally mounted on said frame at a third point for pivotal movement about an axis of rotation from a belt holding position rearwardly to a belt non-holding position for selectively holding said shoulder belt over said door port of said vehicle body when said shoulder belt is manually uplifted thereon at said third point so that said shoulder safety belt is supported at said first, second and third points to provide an unobstructed path to and from said rear seat through said door port, (i) said lever being movable rearwardly to said belt non-holding position in response to rearward movement of said shoulder belt for releasing said shoulder safety belt from said lever and said third point, and (d) biasing means fixed to said frame and said lever for yieldingly biasing said lever to said belt holding position.

3. The invention defined in claim 2 wherein said third point is disposed forward of said first point when said front seat back is in an upright sitting position and rearward of said first point when said front seat back is tipped forward.

4. The invention defined in claim 2 wherein said biasing means includes a spring connected to said lever for urging said lever to said belt holding position.

5. The invention defined in claim 2 wherein said frame is a door molding over said occupant access door port of said vehicle body.

6. A safety belt overhead holder comprising:

(a) a frame, (b) a lever, (c) pivot means for pivotally mounting said lever on said frame for rotational movement between a belt holding position and a belt non-holding position, (d) biasing means coupled to said lever for yieldingly urging said lever to said belt holding position, and (e) mounting means for mounting said frame over an occupant access door port of a two-door vehicle body at a given point over said door port of said two-door vehicle body, (i) said given point being forward of a top portion of a forward foldable front seat back of a front seat in said two-door vehicle body when said seat is in an upright position and rearward of said top portion of said forward foldable front seat back when said front seat back is tipped forward.

* * * * *